United States Patent [19]
Forst et al.

[11] 4,004,647
[45] Jan. 25, 1977

[54] LOAD CELL ARRANGEMENT

[75] Inventors: Donald Laverne Forst, Norton; Edwin Benedict Schrengauer, Wadsworth, both of Ohio

[73] Assignee: The Babcock & Wilcox Company, New York, N.Y.

[22] Filed: Jan. 30, 1976

[21] Appl. No.: 654,144

[52] U.S. Cl. .............................. 177/128; 73/141 R; 177/132

[51] Int. Cl.² ....................................... G01G 21/00

[58] Field of Search .......... 177/128, 132, 145, 154, 177/211, 244, 255, 264; 73/141 A, 141 R

[56] References Cited

UNITED STATES PATENTS

| | | | |
|---|---|---|---|
| 2,472,047 | 5/1949 | Ruge | 73/141 A |
| 3,120,754 | 2/1964 | Lebow | 73/141 A |
| 3,502,164 | 3/1970 | Akuta et al. | 177/164 |

*Primary Examiner*—Joseph W. Hartary
*Attorney, Agent, or Firm*—J. Maguire; R. J. Edwards

[57] ABSTRACT

An arrangement including at least one pair of load cells capable of continuously determining the quantity of material contained within a reservoir and wherein the reservoir support framework will normally convey the load through both cells and includes structural members which can be positioned to by-pass the load around a defective cell and permit the removal thereof without interrupting the operation of the other cell.

15 Claims, 4 Drawing Figures

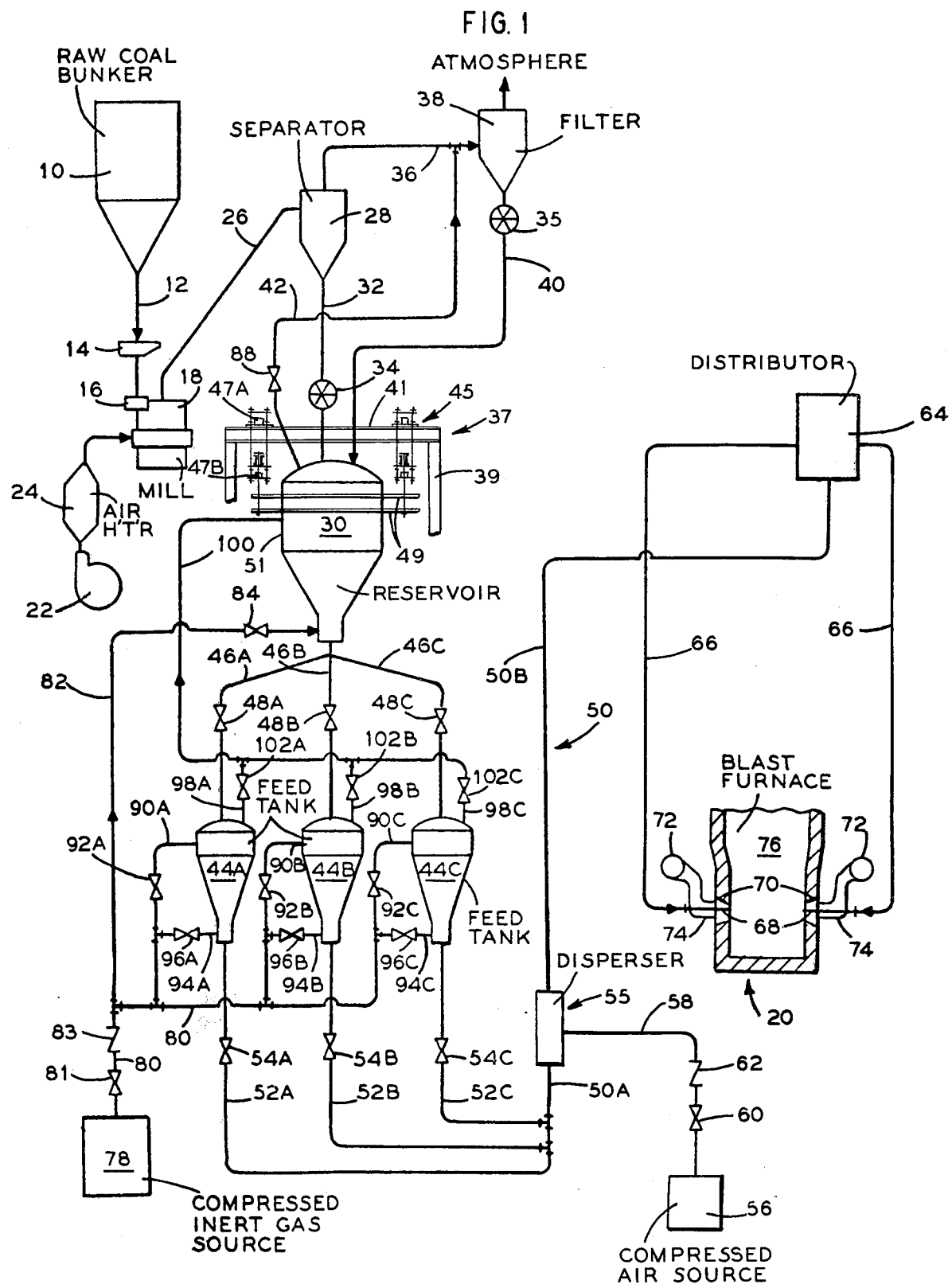

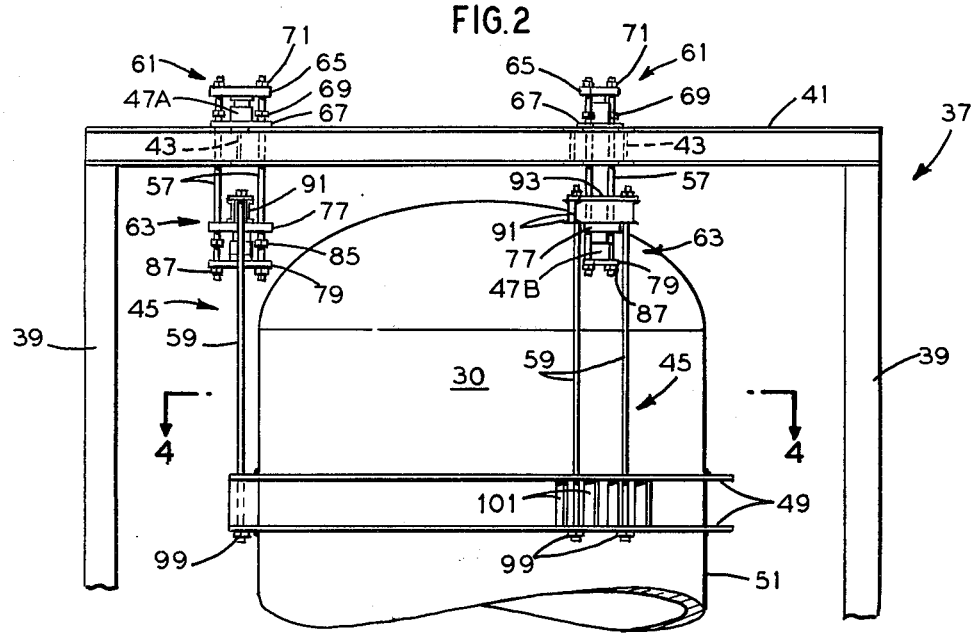
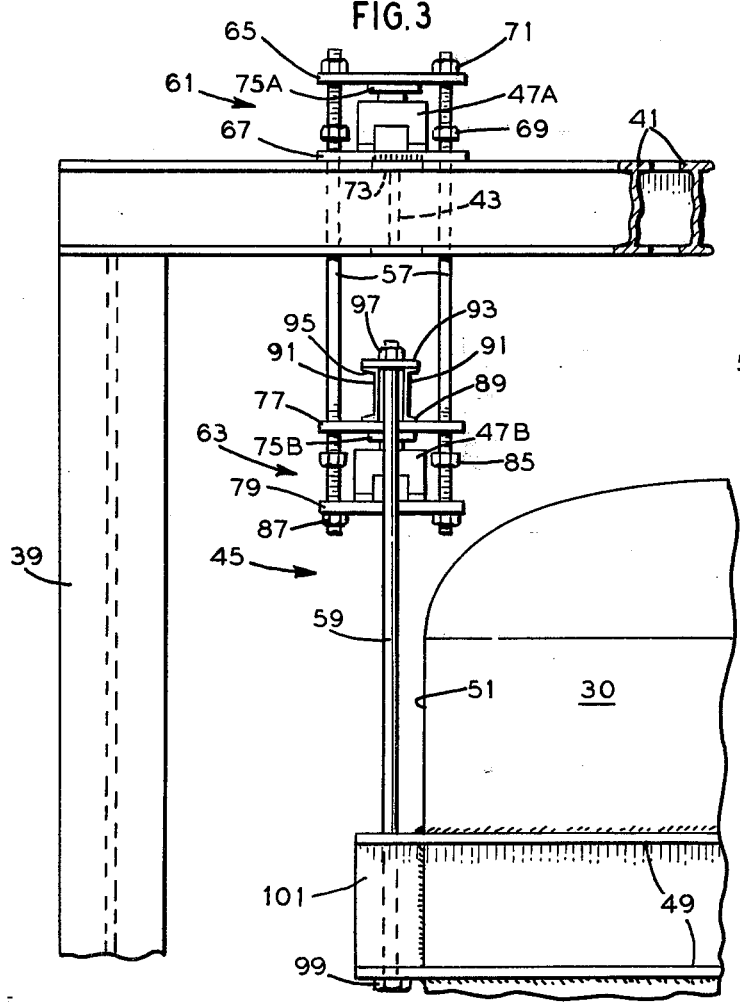

LOAD CELL ARRANGEMENT

BACKGROUND OF THE INVENTION

The present invention relates to material transport systems and more particularly to an arrangement of load cells for monitoring the quantity of material contained within reservoirs associated with such systems.

The reservoir under consideration is generally used in conjunction with transport systems which are required to provide a continuous delivery of material. Accordingly, a predetermined quantity of material must be maintained in the reservoir to act as an interim source in the event of a temporary stoppage in the regular source of supply. Load cells monitor the weight of the reservoir to insure a continued presence of the desired quantity of material. The load cells are generally located between the reservoir and its support structure so that they may accurately monitor the reservoir load while also conveying it to the support structure. A problem arises, however, in the case of a defective load cell wherein clearance must be provided to allow for the removal of the defective cell from under the load of the reservoir and such clearance necessitates the displacement of the reservoir with a concomitant disruption of the load monitoring operation.

SUMMARY OF THE INVENTION

The present invention discloses a load cell arrangement which allows the removal of a defective cell without disrupting the load monitoring operation.

Accordingly, there is provided at least one pair of load cells capable of continuously determining the quantity of material contained within a reservoir. The reservoir support framework will normally convey the load through both cells and includes structural members which can be positioned to by-pass the load around a defective cell and permit the removal thereof without interrupting the operation of the other cell.

BRIEF DESCRIPTION OF THE DRAWINGS

FIG. 1 is a schematic diagram of a blast furnace pulverized fuel preparation and transport system including a load cell arrangement embodying the invention;

FIG. 2 is an arrangement view of the support structure embodying the invention;

FIG. 3 is a detail view of a pair of load cells;

FIG. 4 is a plan view taken along 4—4 of FIG. 2.

DESCRIPTION OF THE PREFERRED EMBODIMENT

The load cell arrangement is herein described with a reservoir used in conjunction with the preparation and transport of pulverized coal to a blast furnace. It should be recognized, however, that the disclosed load cell arrangement may also be used on reservoirs associated with other material transport systems.

FIG. 1 illustrates a coal preparation and transport system of the character generally disclosed in U.S. Pat. No. 3,689,045 and includes a raw coal bunker 10 which discharges through an outlet conduit 12. A gate valve 14 is installed in the conduit 12 and, when open, allows coal to gravitate to a feeder 16, the latter regulates the flow of coal to a mill 18 in response to system demand. The mill 18 grinds the coal to a consistency suitable for pneumatic transport to a blast furnace 20. Air is supplied to the mill 18 by a primary air fan 22. The air is passed through a heater 24 and is preheated prior to its entry into the mill 18. The heated air, passing through the mill 18, dries the pulverized coal and conveys it through an outlet conduit 26 to a cyclone type separator 28. The coal-air mixture entering the separator 28 is centrifugally separated and the coal gravitates to a reservoir or storage tank 30 via a discharge conduit 32, the latter being provided with a rotary valve 34. The minute coal fines which remain entrained in the primary air are carried along with the air through a vent conduit 36 to a bag-filter house 38, or other functionally similar apparatus, and collected therein. The cleaned primary air leaving the bag-filter house 38 is vented to atmosphere while the collected fines gravitate to the reservoir 30 via a discharge conduit 40, the latter being provided with a rotary valve 35. The reservoir 30 operates at atmospheric pressure and is suitably vented through a conduit 42.

The reservoir 30 is top-supported by a structural steel framework 37 which includes upright columns 39, cross beams 41 and pendent supports 45 with the latter being connected to a pair of ring supports 49 which are rigidly attached to the wall 51 of reservoir 30. A plurality of paired load cells 47A and 47B monitor the weight of reservoir 30 to maintain a predetermined quantity of coal therein as an interim source of supply in the event of a temporary shutdown of the mill 18 or associated coal preparation equipment, and thereby insure a continuous delivery of coal to the blast furnace 20.

In accordance with the invention, the load cell arrangement is incorporated in the pendent supports 45. The weight of reservoir 30 is normally conveyed through both load cells 47 A-B of each pair of cells and means are provided whereby each load cell 47 A-B of a pair cells may be replaced without interrupting the monitoring operation of the other load cell.

The reservoir 30 supplies a plurality of feed tanks 44A, 44B and 44C through corresponding distribution conduits 46A, 46B and 46C. The conduits 46 A-C are provided with shutoff valves 48A, 48B and 48C, respectively, which, when open, allow the individual tanks 44 A-C to be filled with pulverized coal.

The feed tanks 44 A-C communicate with the lower segment 50A of a pneumatic transport conduit 50 through corresponding outlet conduits 52A, 52B and 52C provided with respective shutoff valves 54A, 54B and 54C which can be selectively opened to permit coal in dense phase fluidized form to flow from selected tanks 44 A-C, one at a time, to the segment 50A and closed to isolate, from segment 50A, those tanks 44 A-C other than the one currently selected to supply pulverized coal to the blast furnace 20.

Inert gas is used for pressurizing and aerating the feed tanks 44 A-C and also for aerating the reservoir 30. The choice of an inert gas is favored since it precludes the possibility of coal ignition within the reservoir and feed tanks. The inert gas is delivered by a compressed gas source 78 through a supply conduit 80 at a pressure sufficient to maintain coal flow from any given feed tank 44 A-C into and through the segment 50A at maximum anticipated blast furnace demand rate and against the combined transport system pressure drop and the pressure within the hearth 76. The gas supply conduit 80 includes a control valve 81 and a check valve 83. The aeration of the reservoir 30 is accomplished through conduit 82 which connects the reservoir with the gas supply conduit 80 and includes a control valve 84. The venting of the reservoir 30 is accomplished through conduit 42 which connects the reservoir with vent conduit 36 and includes a control valve 88. The pressurization of the feed tanks 44 A-C is accomplished through corresponding conduits 90A, 90B and 90C which connect the tanks 44 A-C with the gas supply conduit 80, respectively, and include control valves 92A, 92B and 92C. The aeration of the feed tanks 44 A-C is accomplished through corresponding conduits 94A, 94B and 94C which connect the tanks 44 A-C with the gas supply conduit 80 and respectively include control valves 96A, 96B and 96C. The venting of the feed tanks 44 A-C is accomplished through corresponding lines 98A, 98B and 98C which connect the tanks 44 A-C with a main vent conduit 100 and respectively include control valves 102A, 102B and 102C. The conduit 100 vents into the reservoir 30.

The pneumatic transport conduit 50 includes an upper segment 50B and a disperser 55 which is fixedly interposed between the conduit segments 50 A-B to effectuate a smooth transition of the coal from dense to dilute phase fluidized form. The pressurized air required for transition of the coal from dense to dilute phase and for conveyance to the blast furnace 20 is supplied to the disperser 55 through a conduit 58 which is connected to a compressed air source 56 and includes a control valve 60 and a check valve 62. The disperser 55 discharges into the segment 50B of the transport conduit 50. The segment 50B is, in turn, connected for discharge into one or more distributors 64 from which a plurality of feed conduits 66 lead to individual tuyeres 70 of blast furnace 20 in a manner similar to that described in U.S. Pat. No. 3,204,942. The number of distributors 64 as well as the number of tuyeres 70 served by each distributor 64 can be varied according to the requirements of the blast furnace 20. The blast air supplied through the tuyeres 70 is heated in regenerative type stoves, not shown, to a temperature of about 1800° F and passes via a conduit, not shown, to a torus shaped bustle 72 and thence to the individual tuyeres 70 by way of gooseneck conduits 74. The coal-air stream from each feed conduit 66 is directed by corresponding nozzles 68 into the hearth 76 of the blast furnace 20 so that each stream is projected into the high temperature blast air being injected through the corresponding tuyere 70.

In the operation of the system, each of the feed tanks 44 A-C is alternately filled, pressurized, and emptied to feed the blast furnace 20 in a predetermined cyclical sequence. For example, when tank 44A is feeding the blast furnace 20, tank 44B is on standby status, filled with coal and pressurized with inert gas, while tank 44C is being filled with coal from reservoir 30.

The aeration valves 96 A-C are preferably left open during operation of the system to insure satisfactory fluidization of the coal within the respective tanks 44 A-C.

The quantity of pulverized coal being delivered to the blast furnace 20 is regulated through the pressurization valves 92 A-C and the vent valves 102 A-C associated with whichever tank is feeding coal. In the event that the actual coal flow rate is less than the demand rate, the pressurization valve will open thereby raising the feed tank pressure to increase the coal flow rate. Conversely, should the coal flow rate be greater than the demand rate, the vent valve will open thereby reducing the feed tank pressure to decrease the coal flow rate.

The pressurized air delivered to the disperser 55, to effectuate the transition of the coal from dense to dilute phase fluidized form and to convey the coal from the disperser 55 to the blast furnace 20, is regulated through valve 60 to provide the acceleration and uniformity of particle dispersion required from a smooth transition from dense to dilute phase and to maintain conduit velocities which will insure steady flow and prevent the settling of coal while minimizing the quantity of relatively cold air being thus introduced into the blast furnace 20. The coal in dilute phase fluidized form is conveyed through the transport conduit segment 50B to the distributor 64 which divides it into a plurality of dilute phase effluent streams of substantially equal coal-air density and coal quantity. The coal-air streams leaving the distributor 64 are conveyed through respective conduits 66 to corresponding nozzles 68 for injection into the hearth 76 of blast furnace 20. The hot blast air, which is introduced through the gooseneck conduits 74 into the tuyeres 70, mixes with the dilute phase coal streams to promote rapid combustion of the coal.

Referring to FIGS. 2 and 3, the reservoir 30 is topsupported by a rigidly interconnected structural steel framework 37 which comprises vertical and horizontal support members 39 and 41, cross beams 43 and pendent supports 45 with the latter being connected to a pair of support rings 49 which are welded to the upright wall 51 of reservoir 30.

Each of the pendent supports 45 includes a pair of elongated upper and lower rods 57 and 59 which extend along intersecting planes. The upper rods 57 straddle the beam 43 and are provided with upper and lower support stages 61 and 63. The upper support stage 61 includes bearing and base plates 65 and 67 which are perforated to slidably fit over the upper rods 57. The upper end portions of rods 57 are threaded to receive locknuts 69 intermediate the bearing and base plates 65 and 67 and locknuts 71 above the bearing plate 65. The base plate 67 is weldably attached to the top flange 73 of cross beam 43 and supports the load cell 47A. The bearing plate 65 is positioned against the sensing element 75A of cell 47A by the locknuts 71. The lower support stage 63 includes bearing and base plates 77 and 79 which are perforated to slidably fit over the upper rods 57. The lower end portions of rods 57 are threaded to receive locknuts 85 intermediate the bearing and base plates 77 and 79 and locknuts 87 below the base plate 79. The base plate 79 is supported by locknuts 87 and, in turn, supports the load cell 47B. The bearing plate 77 is positioned against the sensing element 75B of cell 47B and is weldably attached to the bottom flanges 89 of a pair of cross beams 91. The lower rods 59 connect to the lower stage 63 through a support plate 93 which is welded to the top flanges 95 of cross beams 91. The upper end portions of rods 59 extend through perforations in the support plate 93 and are threaded to engage corresponding locknuts 97 fitted against the plate 93. The rods 59 pass between the cross beams 91 and straddle the bearing and base plates 77 and 79. The lower portions of rods 59 extend through perforations in the ring supports 49 and have threaded ends to engage corresponding locknuts 99 fitted against the lower support ring 49. A plurality of rib plates 101 extend between the support rings 49 and are weldably connected thereto. The plates 101 are paired to straddle the lower rods 59 and provide added strength to the support structure.

Referring to FIG. 4, there is shown the distribution of pendent supports about the wall 51 of reservoir 30 and including the lower rods 59 extending through the upper support rings 49.

During operation of the coal transport system, the load of reservoir 30 is being sensed by all of the cells 47 A-B and is conveyed therethrough and through the pendent supports 45 to the horizontal and vertical support members 41 and 39. The load cells 47A and 47B operate as separate systems with each capable of generating a signal representative of the reservoir load at any given instant. One system is used at a time and generates a load signal that is transmitted to a control circuit, not shown, which regulates the output of mill 18 to maintain the desired quantity of coal in reservoir 30. The remaining system provides an instantaneous check and can be cut into the control circuit should the other system develop a malfunction.

An operating cell will sense the reservoir load as transmitted by the bearing plate whose downward movement signifies an increase in reservoir load and whose upward movement signifies a decrease thereof. In the case of load cells 47A, the motion of bearing plate 65 is governed by the locknuts 71 in conjunction with the upper rods 57, whereas in the case of load cells 47B, the motion of bearing plate 77 is governed by the locknut 97 in conjunction with lower rods 59, the support plate 93 and the cross beams 91. The base plates 67 and 79 support the load cells 47 A-B, respectively. The locknuts 69 and 85 have no direct function with respect to operating load cells and are positioned so as not to interfere with the travel of the rods 57 and the bearing plate 77.

In accordance with the invention, whenever a load cell 47A becomes defective, the locknuts 69 are adjusted to fit tightly against the base plate 67 thereby causing the reservoir load to by-pass the defective cell 47A. Thence, the locknuts 71 are adjusted or removed to permit the displacement or removal of the bearing plate 65 and the removal of the defective load cell 47A.

A replacement cell 47A can be installed in place of the defective cell by seating the replacement cell on the base plate 67; placing the bearing plate 65 on top of the sensing element 75A; adjusting the locknuts 71 to the point where the replacement cell generates a load equal to that of the cell 47B paired therewith; and adjusting the locknuts 69 away from the base plate 67 by a distance exceeding the maximum travel of rods 57.

Whenever a load cell 47B becomes defective, the locknuts 85 are threaded tightly against the bearing plate 77 thereby causing the reservoir load by by-pass the defective cell 47B. Thence, the locknuts 87 are adjusted or removed to permit the displacement or removal of the base plate 79 and the removal of the defective load cell 47B.

A replacement cell 47B can be installed in place of the defective cell by positioning the sensing element 75B against the bearing plate 77; placing the base plate 79 along the bottom of the replacement cell 47B; adjusting the locknuts 87 to the point where the replacement cell generates a load signal equal to that of the cell 47A paired therewith; and adjusting the locknuts 85 away from the bearing plate 77 by a distance exceeding the maximum travel of bearing plate 77.

While in accordance with the provisions of the statutes, there is illustrated and described herein a specific embodiment of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. In combination with a material transport system including at least one reservoir for accumulating a predetermined quantity of material, at least one pair of load monitors capable of continuously determining the quantity of material contained within said reservoir, and support structure normally conveying the reservoir load through both of the monitors, said support structure including means allowing replacement of one of the monitors without interruption of operation of said other monitor.

2. The combination according to claim 1 wherein said monitors are load cells.

3. The combination according to claim 1 wherein said pair comprises spaced upper and lower monitors.

4. The combination according to claim 3 wherein the support structure means includes elongated upright members straddling said monitors.

5. The combination according to claim 4 wherein the support structure means includes bearing plates engaged with the upright members and disposed superjacent to said upper and lower monitors, respectively.

6. The combination according to claim 5 wherein the support structure means includes base plates engaged with the upright members and disposed subjacent to said upper and lower monitors, respectively.

7. The combination according to claim 6 wherein said upright members include threaded end portions.

8. The combination according to claim 7 wherein first locknut means engage the upright members intermediate the bearing and base plates associated with the respective monitors.

9. The combination according to claim 8 wherein under normal operation the first locknut means are respectively spaced a predetermined distance from the base plate associated with the upper monitor and from the bearing plate associated with the lower monitor.

10. The combination according to claim 8 wherein second locknut means engage the upright members above the bearing plate associated with the upper monitor and below the base plate associated with the lower monitor.

11. The combination according to claim 10 wherein under normal operation the second locknut means are respectively fitted against the bearing plate associated with the upper monitor and against the base plate associated with the lower monitor.

12. The combination according to claim 10 wherein replacement of the upper monitor includes said support structure means having corresponding first locknut means fitted against the associated base plate and having corresponding second locknut means spaced from the associated bearing plate.

13. The combination according to claim 10 wherein replacement of the lower monitor includes said support structure means having corresponding first locknut means fitted against the associated bearing plate and having corresponding second locknut means spaced from the associated base plate.

14. The combination according to claim 10 wherein replacement of the upper monitor includes said support structure means having corresponding first locknut means fitted against the associated base plate and having corresponding second locknut means and associated bearing plate disengaged from said upright member.

15. The combination according to claim 10 wherein replacement of the lower monitor includes said support structure means having corresponding first locknut means fitted against the associated bearing plate and having corresponding second locknut means and associated base plate disengaged from said upright member.

* * * * *

UNITED STATES PATENT AND TRADEMARK OFFICE
CERTIFICATE OF CORRECTION

PATENT NO. : 4,004,647
DATED : January 25, 1977
INVENTOR(S) : Donald Laverne Forst et al It is certified that error appears in the above—identified patent and that said Letters Patent is hereby corrected as shown below:

Column 5, line 49, "by" (first occurrence) should read -- to --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks